Nov. 22, 1927.   1,650,374
R. M. MERO ET AL
MULTIPLE SPINDLE AUTOMATIC MACHINE
Filed May 22, 1924   12 Sheets-Sheet 12

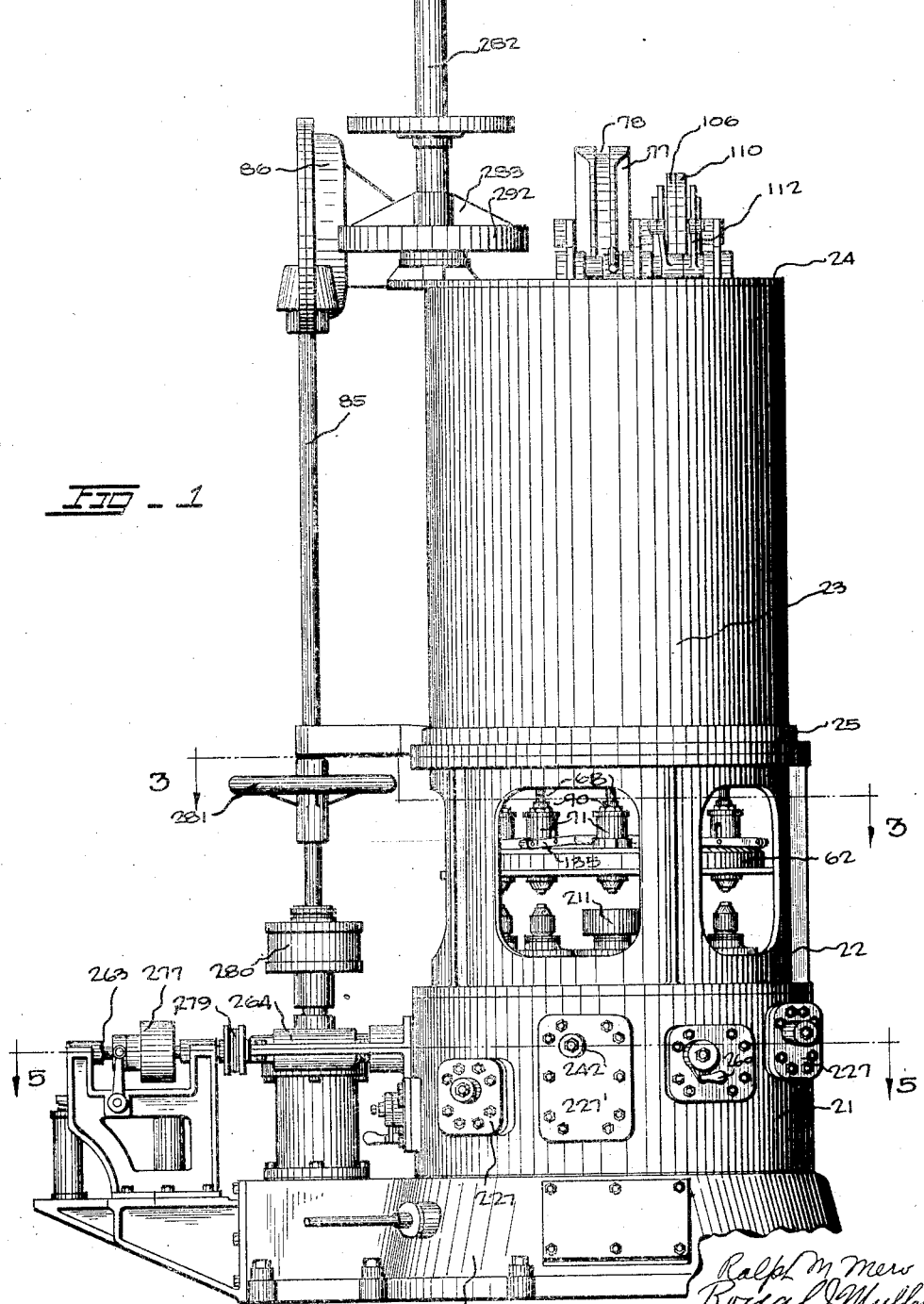

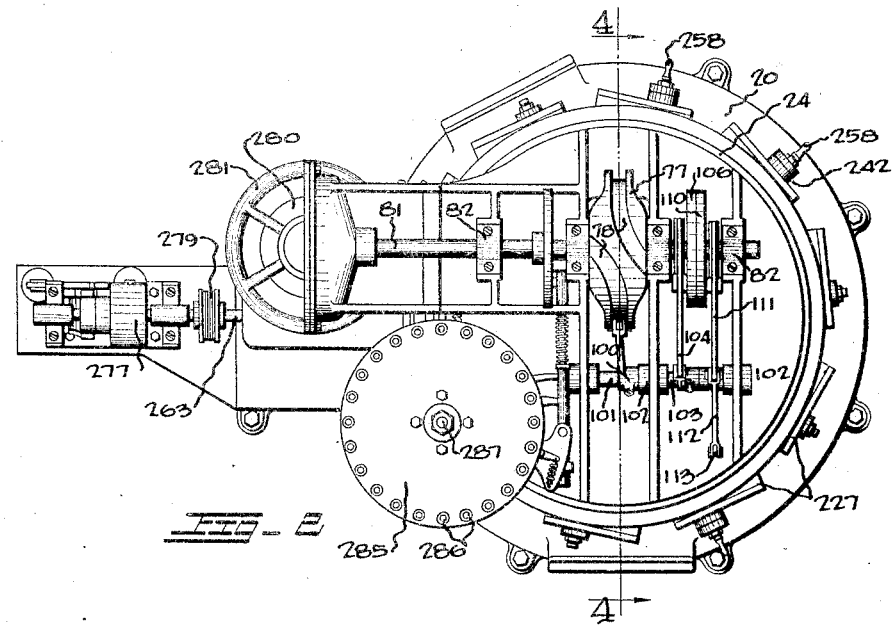
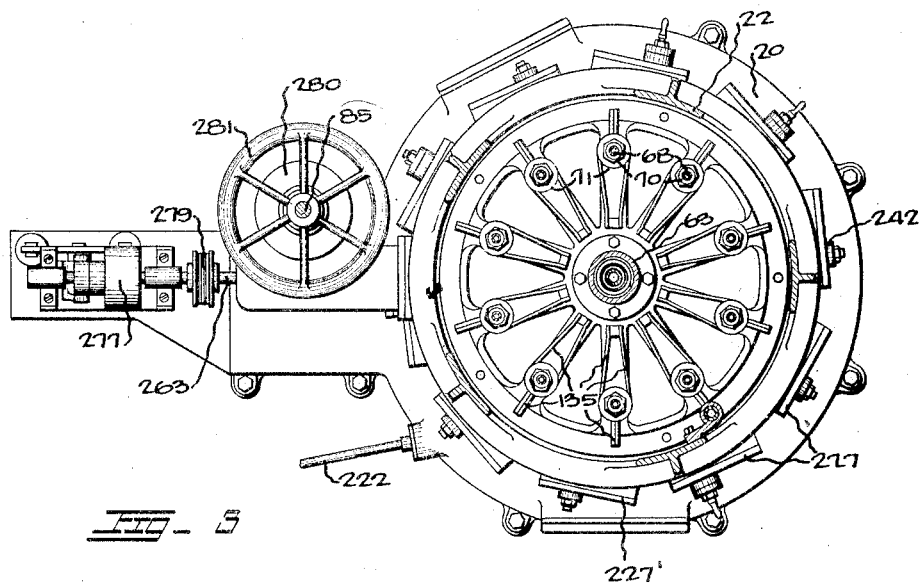

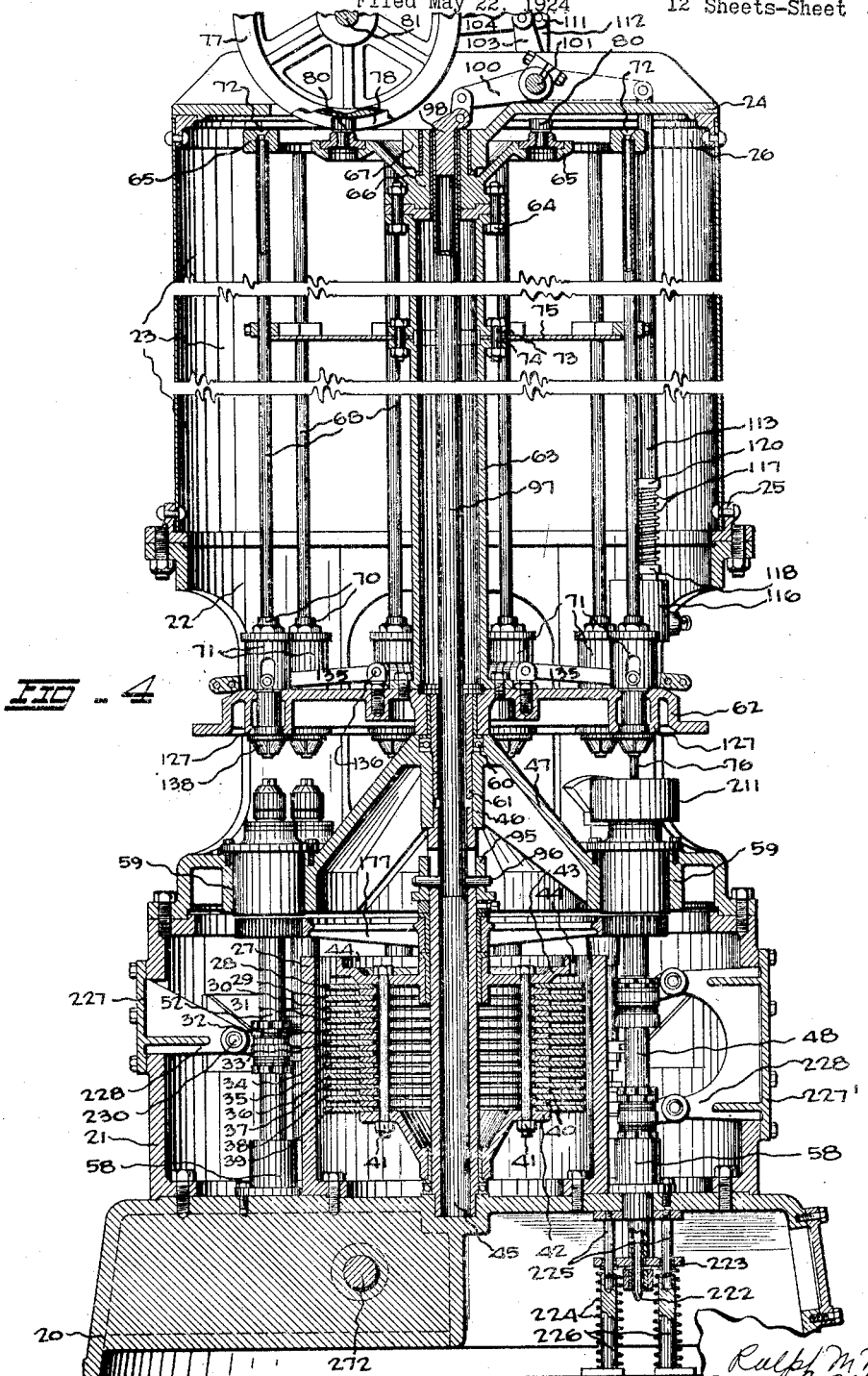

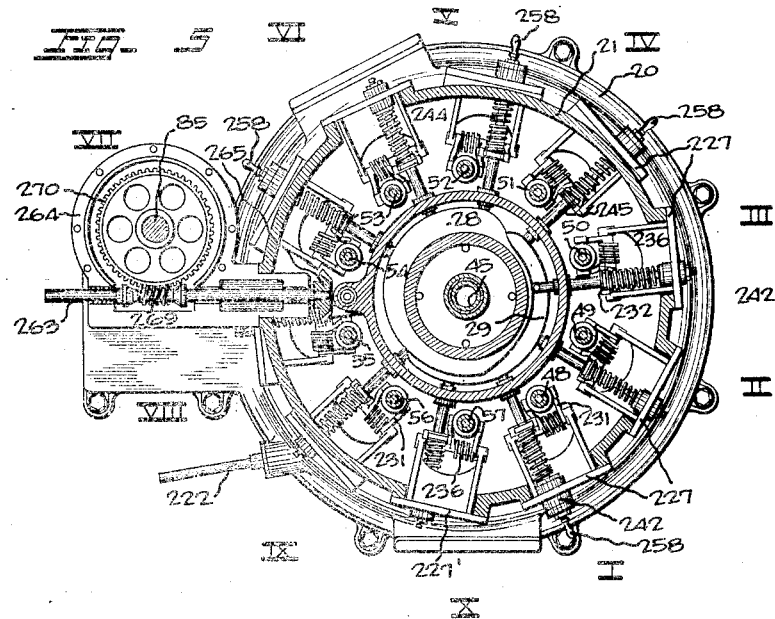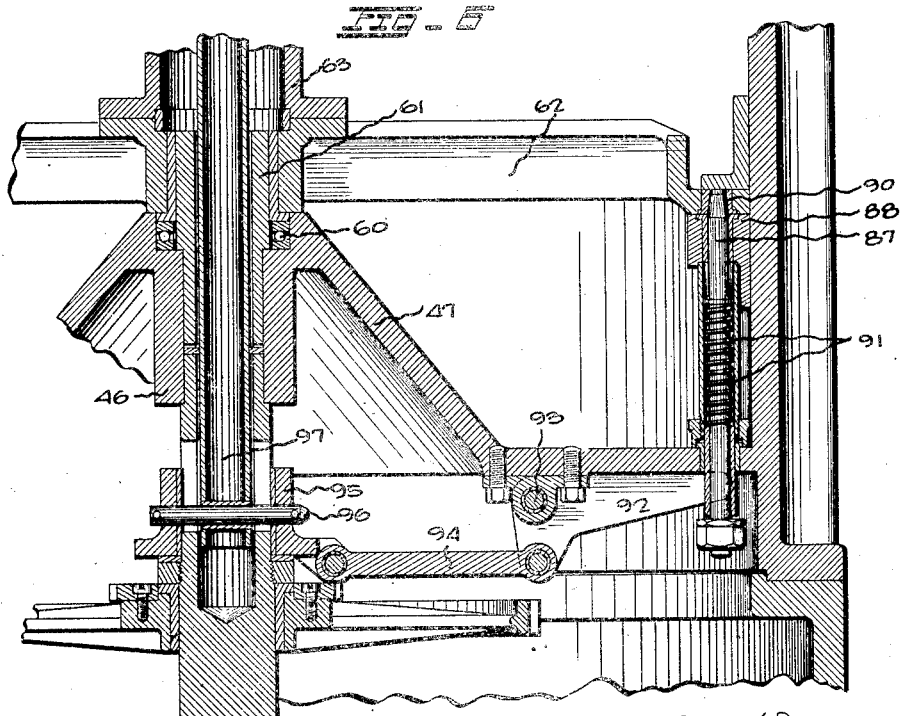

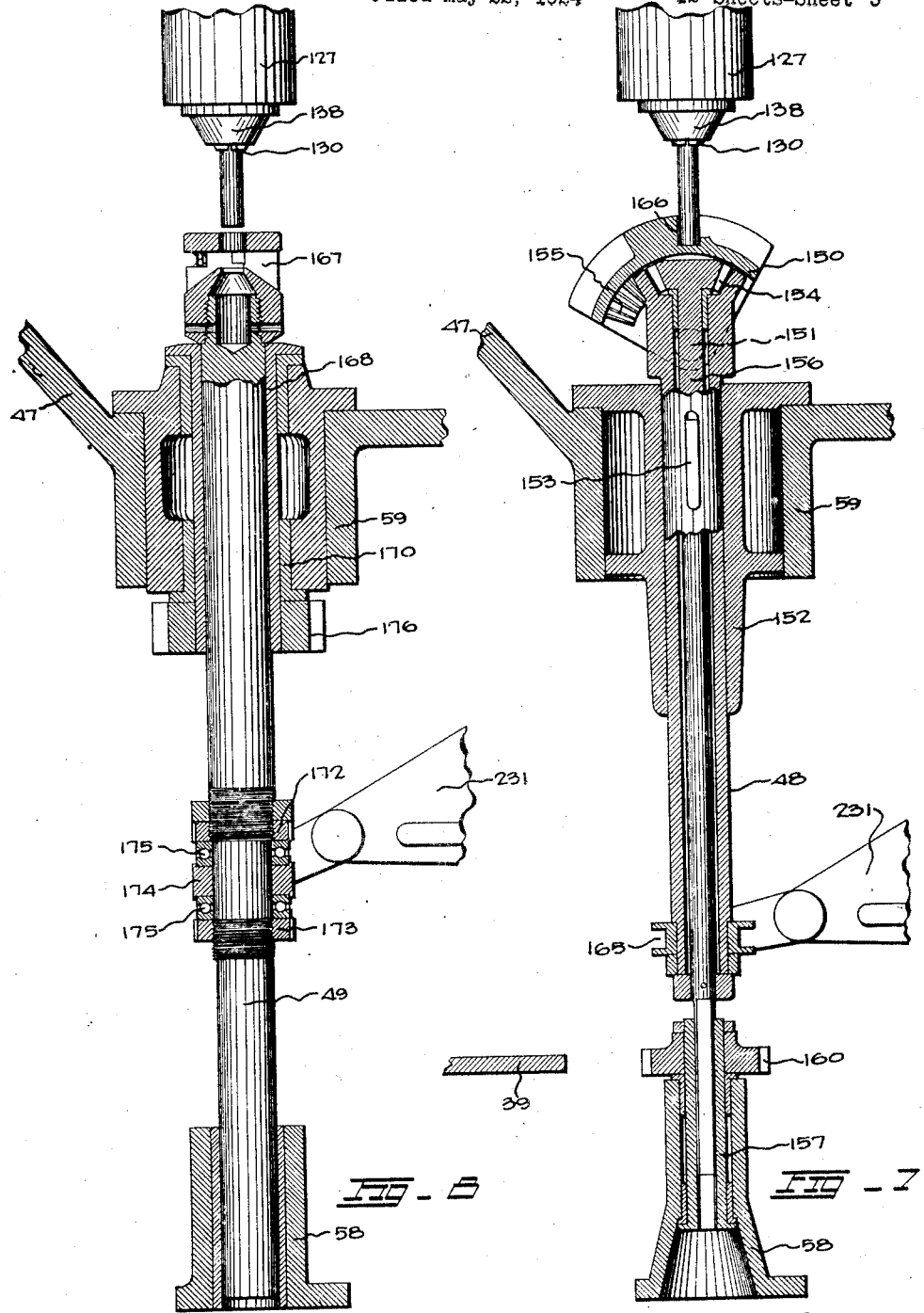

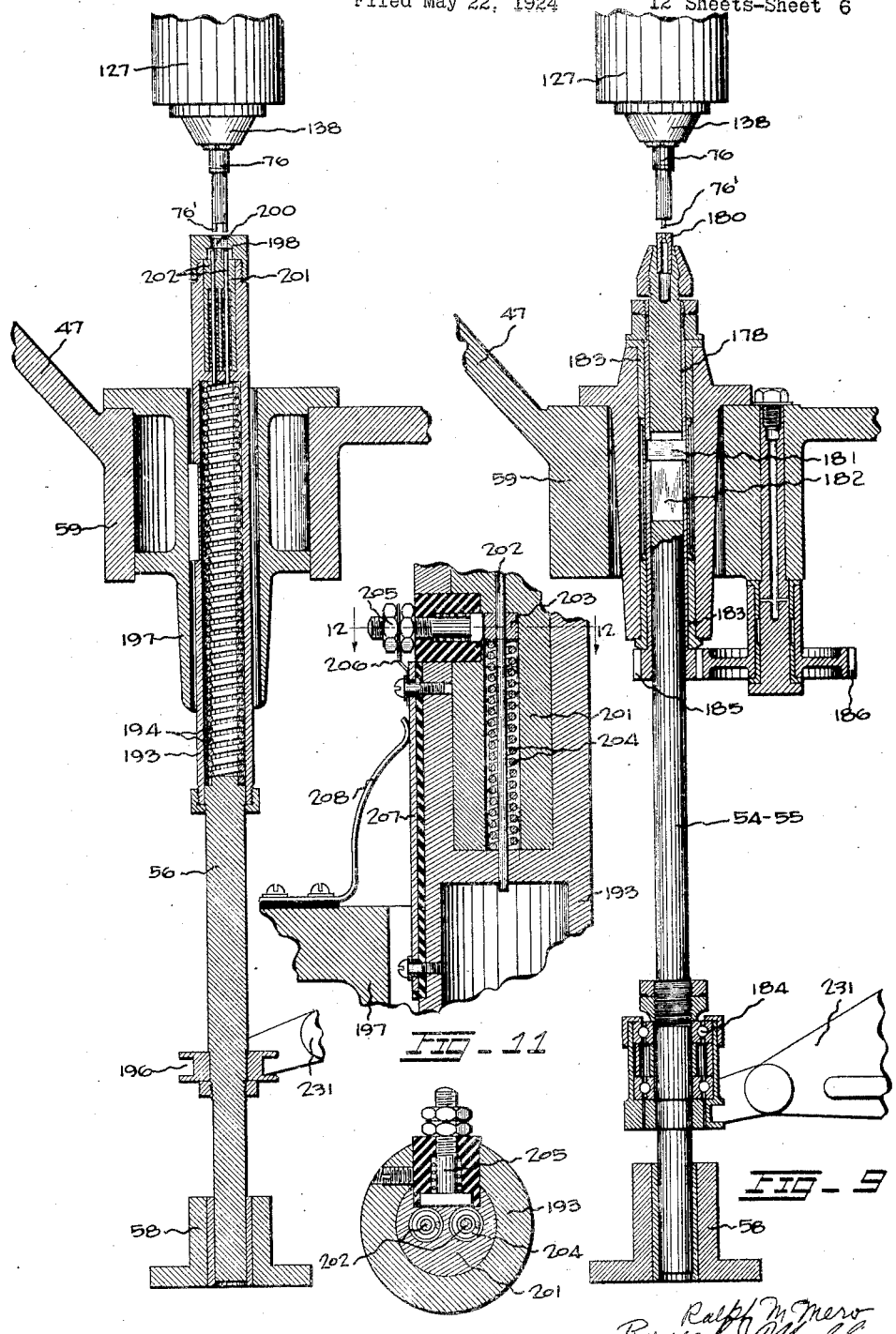

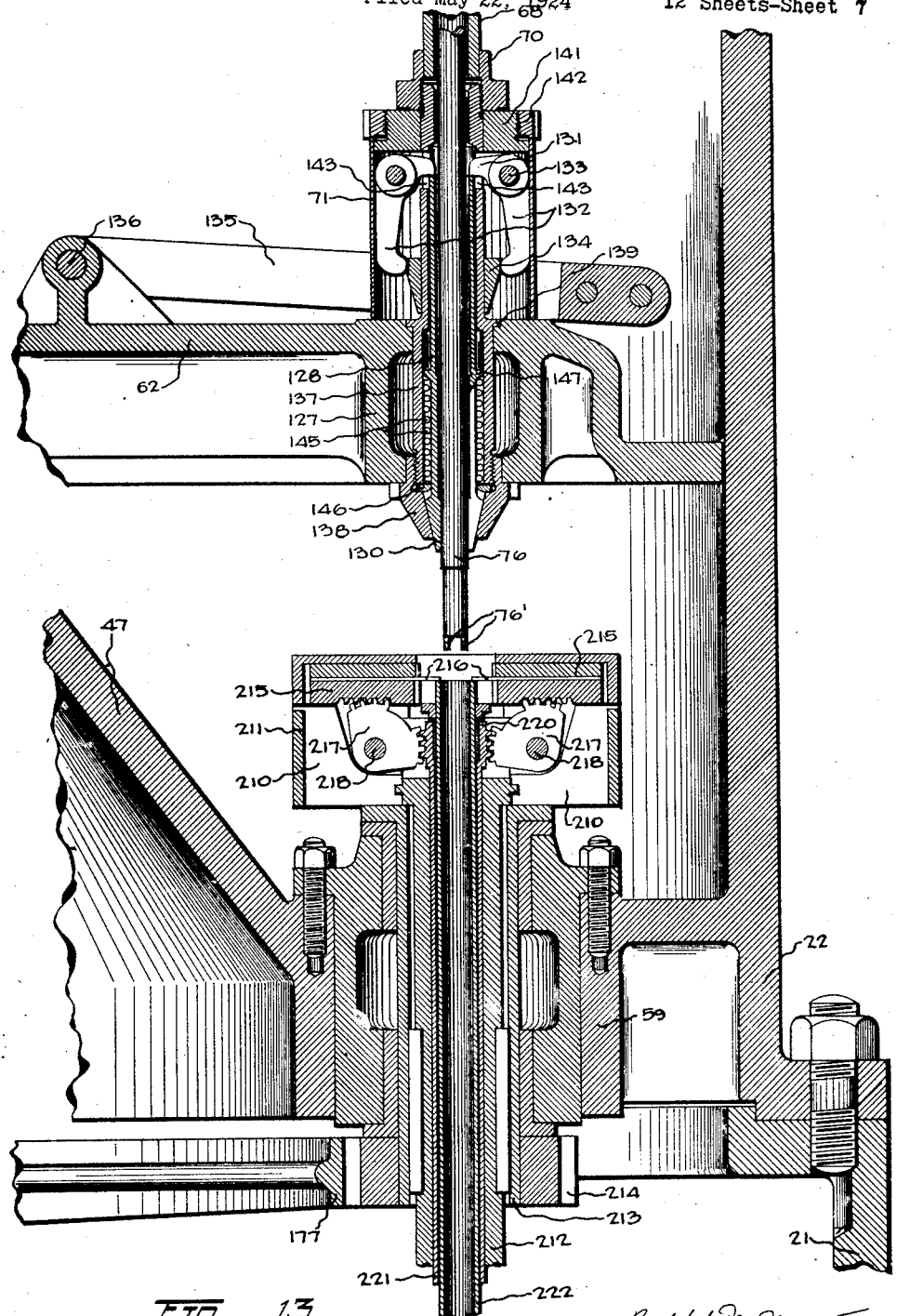

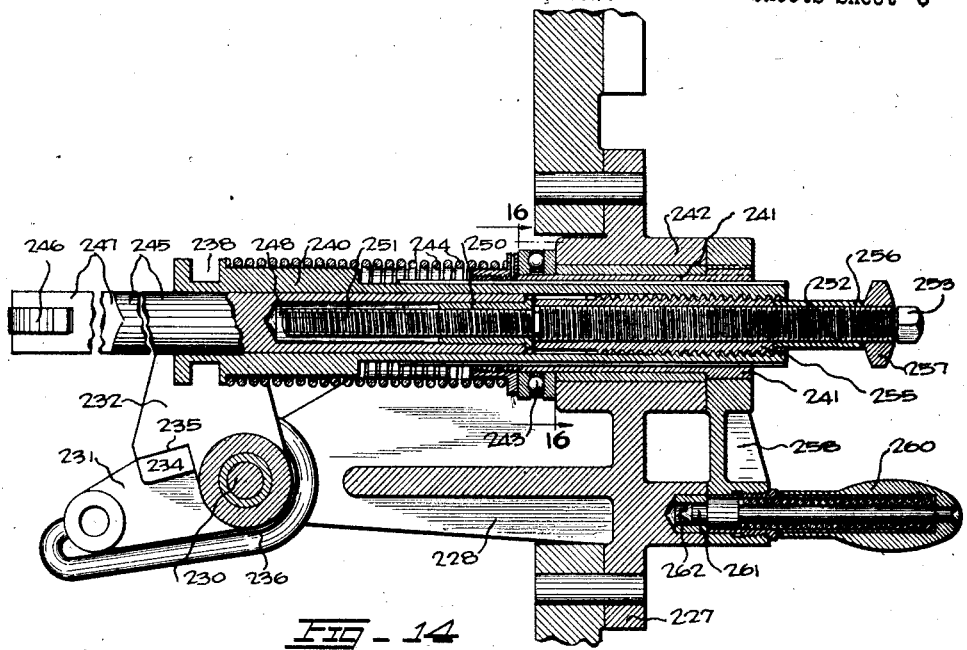
Fig-14
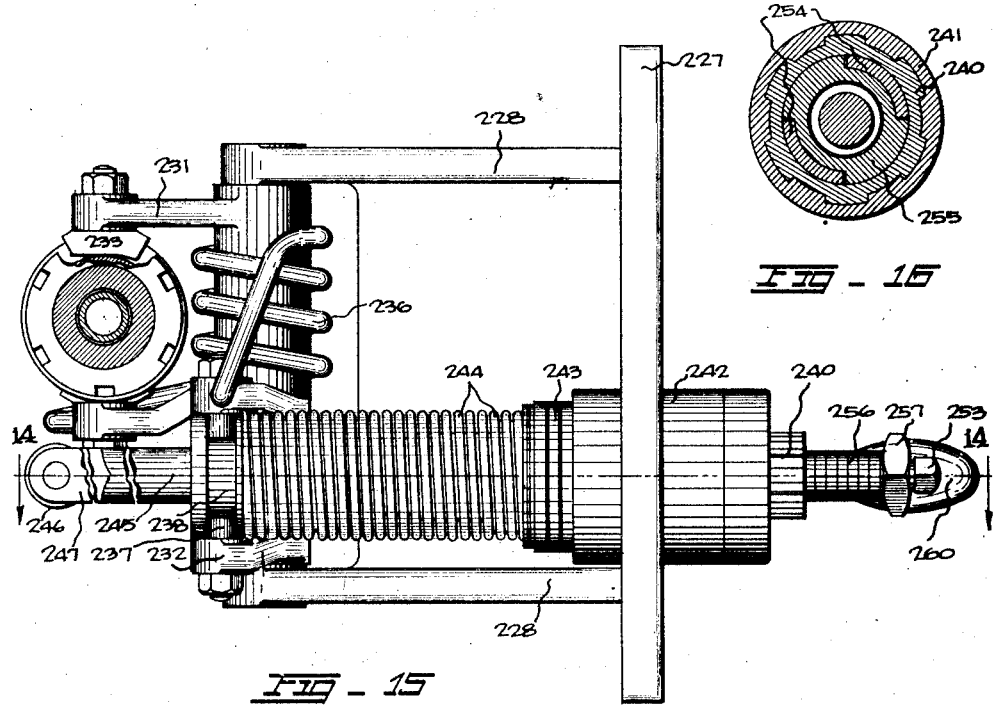
Fig-15
Fig-16

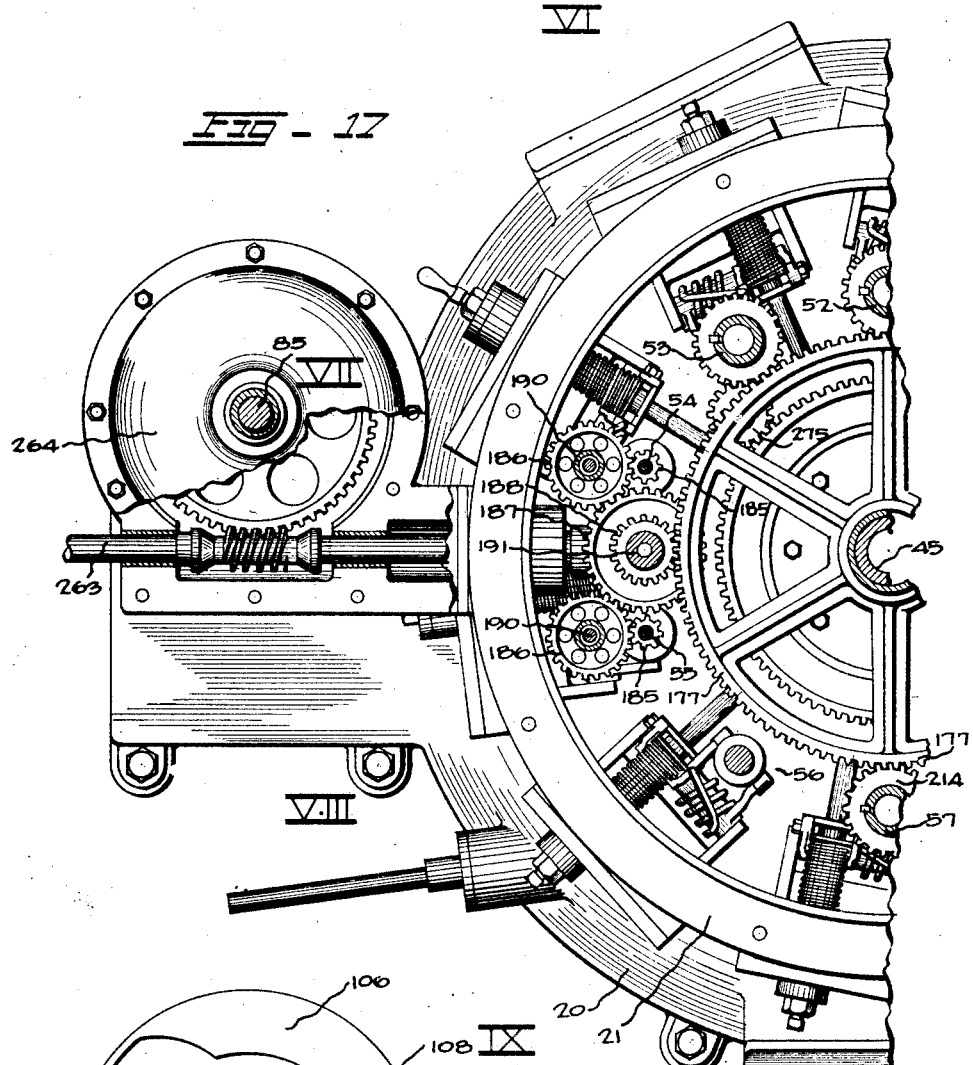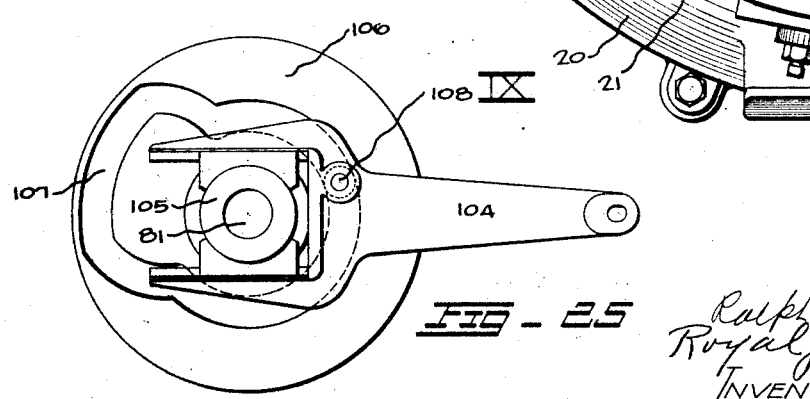

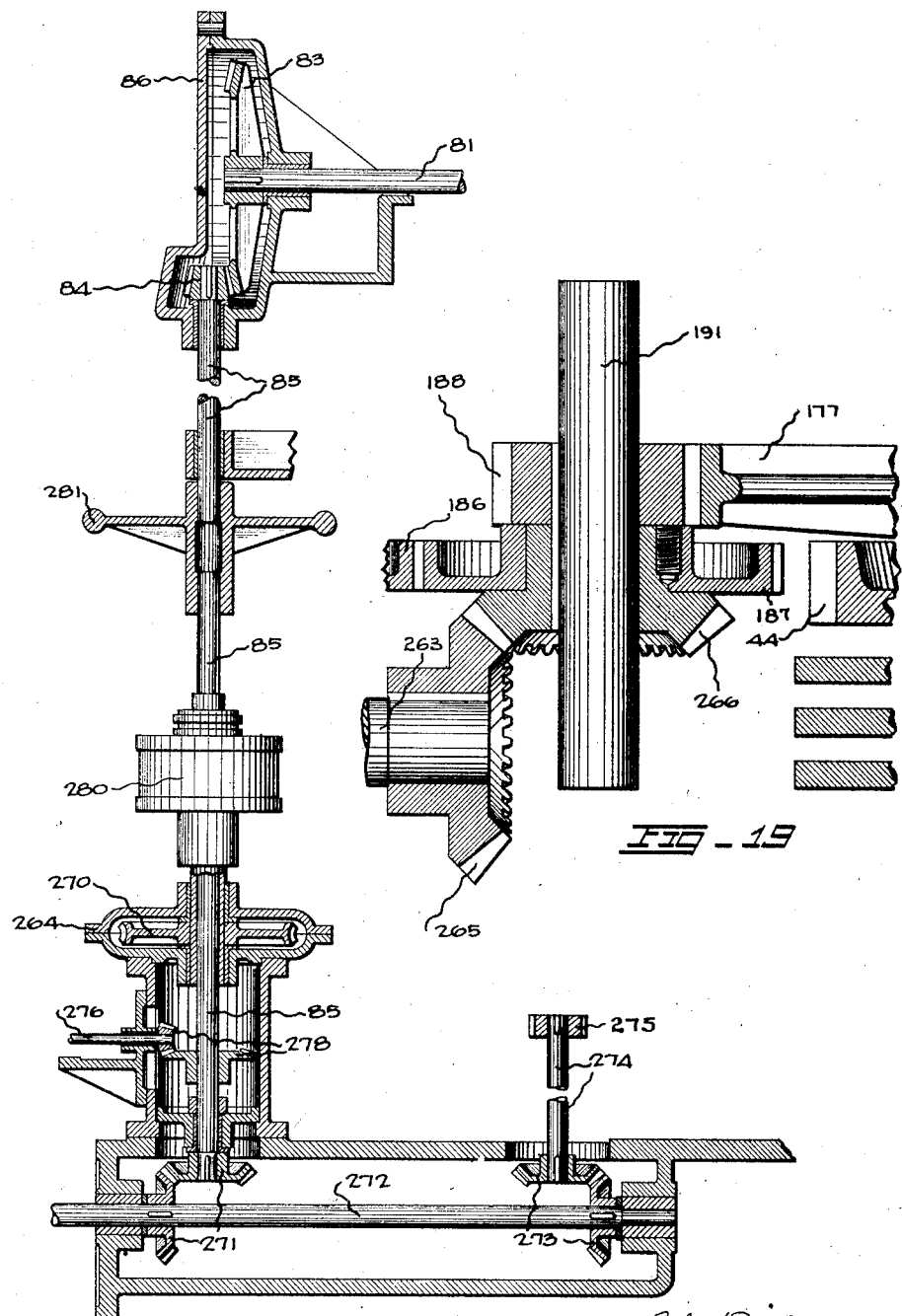

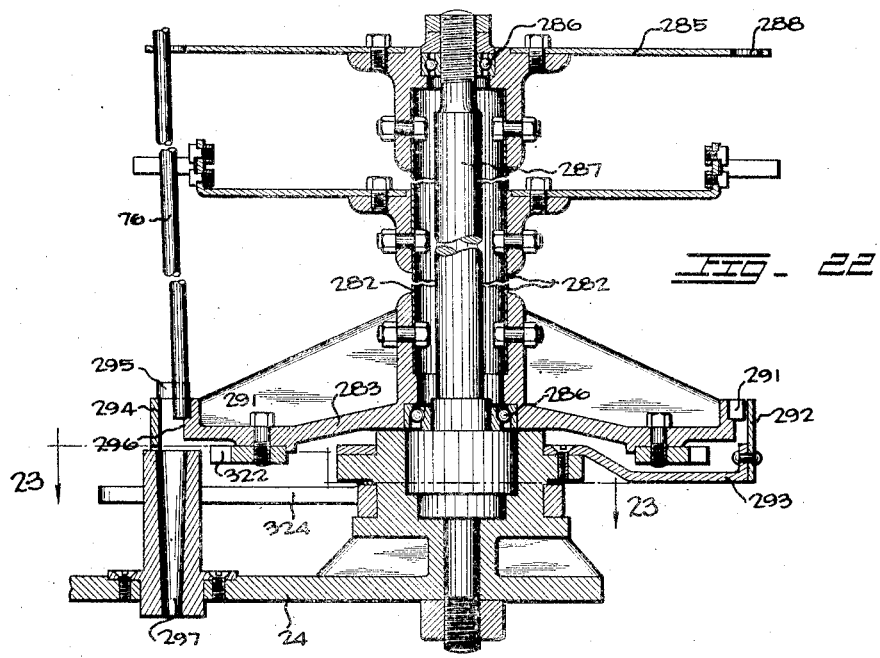
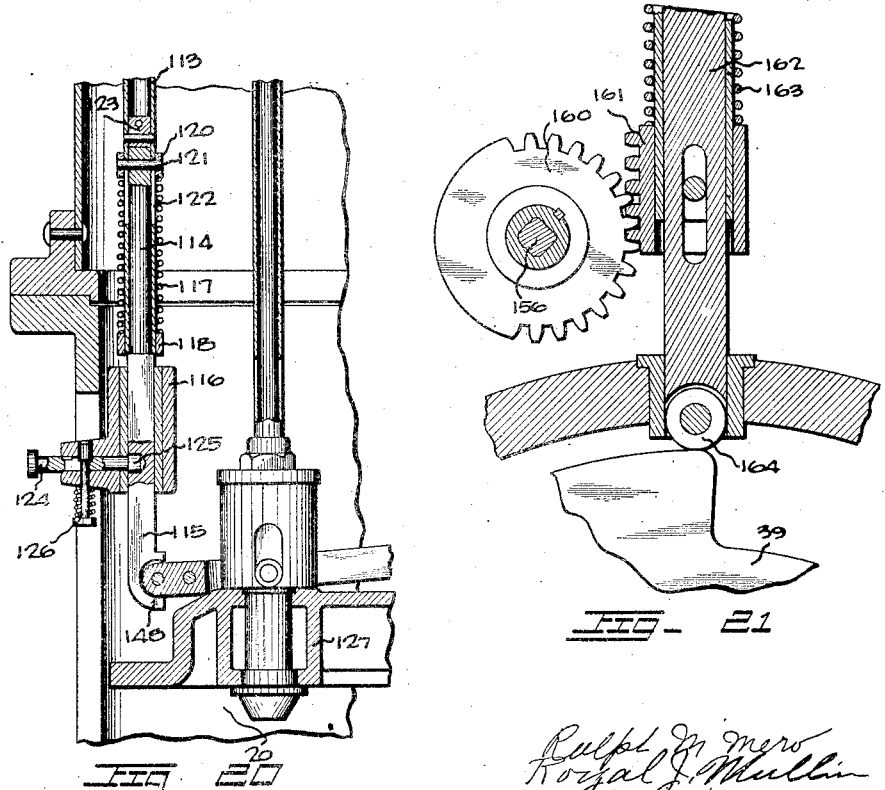

Ralph M Mero
Royal J Mullin
INVENTORS

Patented Nov. 22, 1927.

1,650,374

UNITED STATES PATENT OFFICE.

RALPH M. MERO AND ROYAL J. MULLIN, OF SEATTLE, WASHINGTON, ASSIGNORS TO FRANK E. BEST, INC., OF SEATTLE, WASHINGTON, A CORPORATION OF WASHINGTON.

MULTIPLE-SPINDLE AUTOMATIC MACHINE.

Application filed May 22, 1924. Serial No. 715,120.

This invention relates to improvements in multiple station automatic machines and the object of the invention is to provide a strong and substantial multiple station automatic machine of simple and efficient construction that requires very little care and attention, is fully automatic in all of its operations, that is capable of using bar stock, and that has a very large capacity for turning out work of very great accuracy.

Another object is to provide a multiple station automatic machine of the upright or vertical type that will occupy a minimum amount of floor space and that is readily accessible from all sides.

Another object is to provide a multiple station automatic machine in which the working units are readily accessible and in which simple and efficient means are provided for quickly and accurately adjusting the working units for the production of work of different size.

Another object is to provide a machine of this nature in which the work is fixedly and immovably supported at the work stations and is arranged to be indexed from one to another of said work stations and in which the tools are driven and are arranged to be moved vertically toward and away from the work.

Further objects are to provide a machine in which all of the cams controlling the various movements are grouped at one central location to provide a machine in which the stock, in bar form, is carried in a rotatable stock tube drum supported for indexing movement on a vertical axis and arranged to be securely locked against movement at the work stations; to provide novel and efficient means for automatically supplying bars of stock to the stock tube drum; to provide means for disposing of the last remnant or stub end of a bar of stock when said stub end becomes too short for further use; and to provide on all parts of the machine, automatic safety devices to protect the machine and to guard against the production of inaccurate or faulty work.

Other and more specific objects, will be apparent from the following description taken in connection with the accompanying drawings.

In the drawings Figure 1 is a view in side elevation of a multiple station automatic machine constructed in accordance with this invention.

Fig. 2 is a plan view of the same.

Fig. 3 is a horizontal cross section substantially on broken line 3—3 of Fig. 1.

Fig. 4 is a view in vertical section substantially on broken line 4—4 of Fig. 2, parts being broken away and other parts being shown in elevation.

Fig. 5 is a view in horizontal cross section substantially on broken line 5—5 of Fig. 1.

Fig. 6 is a fragmentary sectional view on an enlarged scale showing the locking means for the stock tube rack.

Figs. 7, 8, 9 and 10 are vertical sectional views respectively showing the loading and stub knockout mechanism, the mechanism for performing external milling operations, the mechanism for milling certain rivets on the end of a piece of work and the tool for testing the finished work.

Fig. 11 is an enlarged fragmentary sectional view showing certain contact making devices embodied in the testing tool shown in Fig. 10.

Fig. 12 is a cross section on line 12—12 of Fig. 11.

Fig. 13 is an enlarged fragmentary sectional view through the cut off tool and a collet that holds a bar of stock.

Fig. 14 is a detached sectional view on broken line 14—14 of Fig. 15 showing a differential screw adjustment and plug length changing mechanism.

Fig. 15 is a detached plan view of the same.

Fig. 16 is a sectional view on line 16—16 of Fig. 14.

Fig. 17 is a fragmentary plan view showing parts of the driving mechanism.

Figs. 18 and 19 are detached fragmentary views partly in section and partly in elevation of the driving gears.

Fig. 20 is a detached sectional view of certain details of the collet unlocking devices.

Fig. 21 is a detached sectional view of rack and pinion devices used for operating the stub knock out mechanism.

Fig. 22 is a fragmentary sectional view showing parts of a stock bar magazine.

Fig. 25 is a fragmentary detail of certain operating means for the stock tube rack locking devices.

Figure 23:
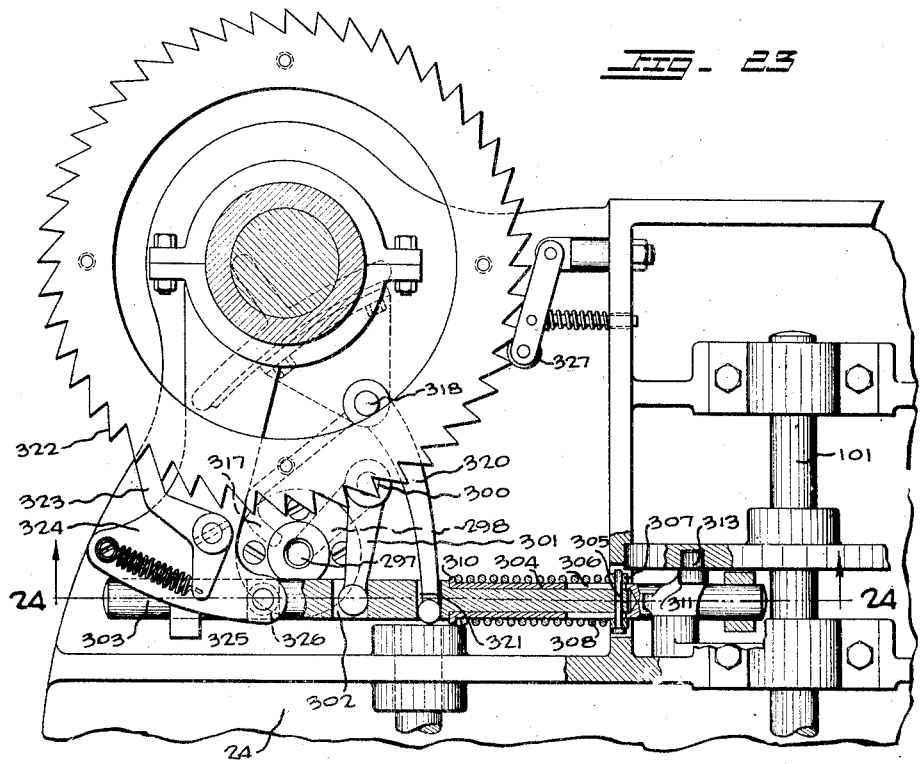
Fig. 23 is a view of the same partly in plan and partly in section substantially on broken line 23—23 of Fig. 22.

Referring to the drawings, throughout which like reference numerals designate like parts, we show an automatic machine, the main frame structure of which embodies a base frame 20, a lower housing 21 mounted on the base frame 20, an upper housing 22 mounted on the lower housing, a stock tube drum 23 mounted on the upper housing and a cover plate 24 mounted on the stock tube drum 23. A base ring 25 is provided at the bottom of the stock tube drum and a top ring 26 is provided at the upper end of said drum.

Disposed within this main frame structure is the operating mechanism by which bars of material are fed into the machine, operated on by driven tools and cut off and discharged as finished articles or as articles ready to be subjected to the operation of other machines.

This machine is specifically designed for blanking or roughing out key plugs for pin tumbler locks and provides ten work stations for carrying out the various operations but it will be understood that the number of stations may be varied and that the machine may be adapted for making other articles without departing from the spirit of the invention.

Mounted on the base frame 20 and extending upward concentrically into the lower frame housing 21 is a cam rod supporting drum 27, Fig. 4 within which are disposed a plurality of cams, 28 to 39 inclusive, hereinafter specifically described, that control the operation of the various tools. The cams 28 to 39 inclusive are all supported in spaced apart relation by spacer plates 40 and are securely clamped by bolts 41 between a base plate 42 and the web 43 of a cam drive gearwheel 44 that is disposed on the top of the cams. The gearwheel 44 and base plate 42 are rotatably mounted on a centrally arranged tubular shank 45 that is supported at the bottom end by the base frame 20 and at the top end by a tubular member 46 that is integral with a cone shaped element 47 that is provided in the bottom of the upper housing member 22, a ball thrust bearing being provided beneath the base plate 42.

Arranged around the exterior of the cam rod supporting drum at equally spaced intervals are a plurality of shafts 48 to 57 inclusive, Fig. 5, that are supported in bearing brackets, 58 on the base frame and in bearing hubs 59 formed in the bottom of the upper frame housing 22.

Mounted on a thrust bearing 60 and supported for rotation on a bushing 61 at the upper end of the cone shaped bottom 47 of the upper frame 22 is a work table or spider 62 having an axially arranged tubular shaft 63 that is secured at its top end as by bolts 64 to an indexing disc 65 at the top of the stock tube drum 23. The indexing disc 65 has a hub 66 that is journaled in a bearing 67 in the cover plate 24 of the stock tube drum 23 and said indexing disc 65 is provided, at a plurality of equidistantly spaced points, with perforations for the reception of the upper ends of vertically arranged stock tubes 68 which stock tubes extend downwardly and are connected by fittings 70 with the upper ends of collet casings 71. The perforations at the upper ends of the stock tubes have expanding or bell shaped mouths 72, Figs. 4 and 24, to assist in directing bars of stock thereinto.

The axial tube 63 is preferably made in two parts whose adjacent ends are flanged as at 73 and secured together by bolts 74, a stock tube supporting disc 75 being clamped between the flanges 73 and serving as a support for the stock tubes 68 between the two ends thereof. The post 63, work table 62, disc 65 and stock tubes 68 form a unitary stock tube rack for receiving bars 76 of stock and supporting the same for indexing movement to successive work stations to permit different classes of work to be done on the ends of the bars.

The stock tube rack or drum embodying table 62, post 63, disc 65 and stock tubes 68 is arranged to be indexed successively from one station to the next by a cam 77, Figs. 1, 2 and 4 that is mounted for rotation on the cover plate 24 of stock tube drum shell 23 and that is provided with a cam slot 78 arranged to successively engage with rollers 80 on the indexing disc 65. The cam slot 78, see Fig. 2, extends slightly more than one complete turn around the cam, is straight throughout the greater portion of its length, but has overlapping ends that curve in opposite directions and terminate at the edges of said cam so that, as the cam 77 rotates, cam rollers 80 on the indexing disc 65 will be successively caused to travel in said cam slot and the stock tube rack indexed thereby. Assuming that a cam roller 80 is in the straight portion of the cam slot 78 said cam roller will remain substantially stationary while the cam 77 rotates through an angle of approximately three hundred degrees and will then be deflected sidewise out of the curved end of the cam slot and the next succeeding roller 80 will be moved into the other end of the cam slot while the cam is moving through an angle of approximately sixty degrees thus indexing the stock tube rack from one station to the next succeeding station. It will be noted that the indexing movement is commenced by the action of the cam 77 on a roller 80 that is passing out of the cam slot and is completed by the action of the cam on another roller 80 that is entering the cam slot on the other side. The cam 77 is mounted on a shaft 81, Figs. 2, 4 and 18, that is supported in bearing brackets 82 and that is provided on its outer end with a bevel gear 83 arranged to mesh with a pinion 84 on the upper end of a vertical driven shaft 85. Gear 83 and pinion 84 are disposed within a suitable housing 86.

The locking and unlocking of the stock tube rack including work table 62 is also controlled by the rotation of the same shaft 81 on which the indexing cam 77 is mounted. The mechanism for locking and unlocking this stock tube rack, Fig. 6, comprises a plurality of lock bolts 87 supported for vertical movement in guide brackets 88 that are secured to the peripheral wall of upper housing 22 and are arranged to project upwardly into, and be withdrawn from, tubular bushings 90 that are provided in the peripheral portion of the work table. Compression springs 91 are provided for urging the bolts 87 upwardly. The lower ends of the lock bolts 87 are slotted for the reception of the ends of bell crank lever arms 92 that are fulcrumed on pins 93 and are connected by links 94 with a collar 95 on the axial post 45. Vertical movement of collar 95 produces a toggle like action of links 94 which oscillates bell crank levers 92 and moves lock bolts 87. Collar 95 is connected by cross pin 96, with vertically movable shaft 97, which is connected at its top end by bracket 98, Fig. 4, with crank arm 100 on shaft 101. Shaft 101 is journaled in bearings 102 and has lever arm 103 rigidly secured thereon and connected at its top end with one end of link member 104, the other end of link member 104 being forked and being arranged to fit over the hub 105 of cam 106, Figs. 2 and 25. Cam 106 is fixed on and is rotatable with shaft 81 and is provided with a cam slot 107 for the reception of a roller 108 on the link 104, the cam slot 107 being shaped so that it will move the link 104 endwise at the proper instant in the cycle of operation of the machine, and, by rocking the shaft 101 and raising or lowering the outer end of the lever 100 will unlock and lock the stock tube rack as hereinbefore explained.

Devices are provided in connection with shafts 81 and 101 for locking and unlocking the collets that hold the bars of stock at one station known as the loading station. These devices embody a cam 110, Figs. 2 and 4, secured to and rotatable with shaft 81 and having a cam slot and roller connection with a link 111 that is substantially the same as the cam slot and roller connection just described in connection with cam 106 and link 104 that is adapted to move link 111 endwise. Link 111 is connected with the upper end of a bell crank lever 112 that is loosely mounted on shaft 101 and that has its other end connected with a vertically movable tubular collet locking rod 113 that extends downwardly into the machine. The lower end of collet locking rod 113, Fig. 20, fits over the cylindrical end 114 of a collet locking member 115 that is guided for vertical movement in a bracket 116. A compression spring 117 on the exterior of rod 113 rests upon a collar 118 on the bottom end of the rod 113 and exerts an upward pressure on another collar 120 that is slidable on rod 113 and is secured by cross pin 121 to the end 114 of the collet locking member 115. The cross pin 121 is movably disposed in slots 122 in rod 113 and the top end of collet locking member 114 is adapted to strike against a stop member 123 that is rigid with the rod 113 so that the collet locking member 115 will be positively forced down by non-yielding means when rod 113 is depressed, but the spring 117 compressing and serving to permit rod 113 to be moved upwardly without moving the collet locking member is locked down as hereinafter explained.

The collet locking member 115 may be locked in the lowered position by a manually operated locking pin 124 that projects into the guide bracket 116 and is arranged to enter a recess 125 in collet locking member 115. Another pin 126 is provided for locking pin 124 either in engaged or retracted position. The collet locking and unlocking means just described is provided only at the loading station or station at which the bar of stock is lowered after a finished article has been cut off preparatory to fashioning another similar article, it being understood that the bar, after being lowered, remains securely locked in the collet until it travels entirely around the machine and arrives again at the loading station.

The collet units, proper, are supported in hubs 127, Figs. 4 and 13, formed in the work table 62 and each comprise a slidably mounted tubular collet sleeve 128 having a split chuck or gripping member 130, Fig. 13, at the bottom end arranged to grip a bar of stock 76. The upper end of the collet sleeve is arranged to be engaged by pawls 131 on the upper ends of bell crank shaped collet lock fingers 132 that are mounted on pivots 133. The lower ends of the collet lock fingers 132 engage with inclined cam surfaces on a collet cross head 134 that is arranged to be raised and lowered by a collet locking arm 135 that is adapted to be operated by the collet locking member 115 hereinbefore described, the collet locking arm being of duplex construction, pivoted at one end on pivots 136 and one collet locking arm being provided for each collet.

The collet sleeve 128 is disposed within a collet shell 137 that fits within the hub 127 in the work table 62 and that has a collet cap 138 screwed onto the lower end thereof, the collet cap being tapered internally and cooperating with the externally tapered surface of the split collet chuck 128 to cause said chuck to grip or release a bar of stock. The collet cap 138 also serves as a nut for securing the collet shell 137 to the hub 127, the collet shell 137 having an external flange 139 that seats in a counterbore on the top of the hub. The collet locking devices are housed within the tubular collet casing 71, the bottom end of which rests on the work table 62 and the upper end of which fits over a collet adjusting member 141 and supports a nut 142 that screws onto the member 141. The collet shell 137 has slots 143 through which the pawls 131 of locking fingers 132 project and the top end of such collet shell projects upwardly through the adjusting member 141 and is externally threaded for the reception of the coupling nut 70 that supports the lower end of the stock tube 68 with which the collet is connected.

A compression spring 145, disposed within the lower portion of the collet shell 137 rests upon a washer 146 that is supported between the collet cap 138 and the bottom end of the collet shell 137 and exerts an upward pressure on an external flange 147 on the collet sleeve. The washer 146 serves as a support for the spring 145 and also serves to limit the upward movement of the collet sleeve.

In the operation of the machine the collets remain locked at all stations except the loading station. As each collet is moved to the loading station the collet locking arm 135 of that collet moves into a notch 148 in the bottom end of the collet locking member 115 and as soon as the stock tube rack is properly locked the collet locking member 115 will be caused to raise the end of the collet locking arm 135 thus unlocking the collet and permitting the bar of stock 76 to drop down. As soon as the bar of stock has had ample time to drop down and be properly positioned the locking member 115 will again be lowered and the bar 76 grasped and held by the collet.

When a bar of stock 76, is permitted to drop down at the loading station, Fig. 7, it will strike on a combined stub knockout and gauge member 150 that is connected by pivots 151 with the top end of the shank 48 at the loading station. The shank 48 is guided for vertical movement in a guide member 152 that is supported in the bottom of the upper housing member 22 and rotation of said shank in the guide member is prevented by a key 153. The gauge member 150 is arranged to be oscillated or turned over to one side by a gear pinion 154 that meshes with a gear rack 155 in the gauge member. The gear pinion 154 is secured to the top end of a shaft 156 that extends downwardly through the shank 48 and has its bottom end slidably but not rotatably disposed within a sleeve 157 that is journaled in a bearing bracket 58 and that has a gearwheel 160 mounted on the upper end thereof. Gearwheel 160 is arranged to mesh with rack 161, Fig. 21, on longitudinally movable cam follower rod 162 that is urged inwardly by a compression spring 163 and that has a roller 164 on its inner end arranged to roll on the periphery of the cam 39, the spring 163 being arranged so that it will tend to turn the shaft 156, unless said shaft is held against rotation, whenever the cam 39 leaves the roller 164 free to move inwardly.

Means, hereinafter explained, are provided, for engaging with a grooved collar 165 and lifting the shank 48 that carries the gauge member 150, the shank preferably being in the lowered position shown in Fig. 7 when indexing movement of the stock tube rack takes place then being raised to correctly position the bar of stock after said bar has dropped down onto the gauge member, then being again lowered after the collet has gripped the bar and before the next indexing movement takes place. It will be noted that the gauge member 150 has a relatively high shoulder 166 at one side of the surface on which the end of the bar of stock rests when it drops down, said shoulder being adapted to exert a sidewise pressure on the end of the bar of stock so that if the last stub end of a bar drops entirely out of the collet said stub end will be thrown off to one side by the tilting of gauge member 150 due to the pressure of spring 163 when cam follower rod 162 is released by cam 39.

From the loading station, herein designated as station number I, the collet is advanced to station number II, at which, a rotary milling tool 167, Fig. 8 is moved up over the end of the bar of stock roughing off the outside of the same. The milling tool, Fig. 8, is secured to the top end of shank 49 that is splined in a sleeve 168 that is journaled in bearing 170. The lower end of shank 49 is mounted in a bearing block 58 that may be secured to the base frame 20. Shaft 49 is provided between the upper and lower bearings with two spaced apart thrust collars 172 and 173 between which is interposed a sleeve 174 having at each end thrust bearings 175 and arranged to be connected with mechanism hereinafter described by which the shaft 49 may be raised and lowered. The lower end of the sleeve 168 has a gearwheel 176 secured thereon which may mesh with a driving gear 177 for the purpose of driving the shaft 49.

The arrangement at station number III and station number VI is substantially the same as the arrangement just described at station number II. The rough milling of the exterior of the work is started at station II and completed at station III and the exterior is finished by a milling tool at station VI.

At stations IV and V tool units are provided for rough milling rivets 76' on the ends of the bar 76 of stock. The operating mechanism for these tool units embodies the two shanks 51 and 52 shown in Fig. 5 and is substantially the same as the driving mechanism shown in Fig. 8 and hereinabove described except that the shafts 51 and 52 are slightly eccentric relative to the bar 76 to correspond to the position of the rivets 76' and are provided with tools suitable for milling the rivets 76' as shown in Fig. 9 instead of being provided with tools of the form shown in Fig. 8.

At stations VII and VIII tools are provided for finishing the milling of the rivets 76' such tools embodying shafts 54 and 55, respectively, Figs. 5 and 9, that are each slidable in a sleeve 178 and are provided on their upper ends with milling tools 180. Each sleeve 178, Fig. 9, and its respective shaft 54 or 55 are locked together for rotation by a cross key 181 that extends through a slot 182 in the shaft 54 or 55 and has its ends anchored in the sleeve 178. Each sleeve 178 is mounted for rotation in bushings 183 that are supported in the bottom of the upper housing 22. A ball thrust collar device 184 is provided near the bottom end of each shaft 54 and 55 by which the shaft may be raised and lowered.

Sleeve 178 at each of stations VII and VIII has a gearwheel 185 on its lower end that is connected by intermediate idler gears 186 and 187, Figs. 9, 17 and 19, with driven stub shaft 191 on which is disposed gear 188 that meshes with, and is driven by main driving gear 177 thereby affording a high speed drive for these finishing tools. Idler gears 186 are mounted on shafts 190 and idler gears 187 and 188 are mounted on stub shaft 191. Shafts 190 and 191 are both journaled in suitable frame brackets, not shown.

At station IX devices are provided for testing the work that has been done at the preceeding stations said devices comprising the shaft 56 Figs. 10, 11 and 12, the upper end of which extends into tube 193 and abuts against compression spring 194. The lower end of shaft 56 is reciprocably disposed in bracket 58 and a collar 196 is provided at a short distance above bracket 195 by which the shaft may be raised and lowered. Tube 193 is slidably disposed in bearing member 197 in the bottom of the upper housing 22 and said tube is provided at the upper end with a cap 198 having an opening 200 that will exactly fit over the exterior of a piece of work after the work is finished.

The upper end of the tube 193 is also provided with an insert in the nature of a plug 201 wherein is disposed two pins 202, Figs. 10, 11 and 12 that are longitudinally movable and are provided with contact collars 203 that are engaged by compression springs 204 for yieldingly urging the pins 202 upwardly. The upper ends of the pins 202 are arranged to strike against the ends of the rivets 76' on the bottom of the bar 76 as the test tool is raised so that if the rivets are properly formed and correctly positioned the test pins 202 will be depressed each time the test tool moves upwardly.

The contact collars 203 on the test pins 202 are arranged to make electrical contact with the head of a contact bolt or post 205 at all times except when said pins 202 are depressed. The post 205 is connected by wire 206 metal strip 207 and spring 208 with an electric circuit that is normally open but that is arranged to be closed for a brief period of time by external means at the instant a test is being made so that if the piece that is being tested is correctly made the circuit will be broken between the collars 203 which constitute the grounded side of the circuit and the post 205 at the instant said circuit is closed by the external means thus preventing the flow of any current through the circuit. If, however, the piece is not properly and correctly formed as if one or both of the rivets 76' are broken off or are too short or if the piece is too large in diameter, over all, to enter the opening 200 then the circuit between collars 203 and the post 205 will remain closed while the test is being made, and, when the electric circuit is closed by the external means, devices will be set in operation for indicating that said piece of work is imperfect or for discarding the same or for doing both.

After being tested the work is finished except for cutting the same off from the bar of stock on which it has been formed. The cutting off is done at station No. X by a tool of the form shown in Fig. 13. This tool comprises a tool head 210 disposed within a shell 211 and rigidly secured to a shank 212 that is keyed to a bushing 213 and is arranged to be rotated at relatively high speed in a suitable bearing in the bottom of upper housing member 22 by a gear pinion 214, Fig. 17, that meshes with driving gear 177. Disposed within the shell 211 and supported in guideways in head 210 are two blocks 215 each carrying a cutting tool 216 and each provided on the bottom with gear teeth arranged to mesh with the teeth on a gear segment 217. Gear segments 217 are mounted on pivots 218 and are arranged to mesh with a gear rack 220 on the upper end of a sleeve 221 that is disposed within the shank 212. A tube 222 extends upwardly through the sleeve 221 and terminates just below the blades 216 so that a piece of work that is cut off will drop through the tube 222 and thereby be disposed of. Near the bottom of the machine the tube curves to one side so that the finished work may be delivered clear of the machine, Figs. 3 and 5.

In the operation of the cutting tool, each indexing movement brings a finished piece of work into position directly above the cutting off tool. As soon as this is done the entire cutting off tool which is rotating rapidly is raised by tool elevating cam 32 to bring the cutting tools 216 up to the proper point where the cut is to be made. Cut off tool feed cam 36 then begins to move sleeve 221 downwardly thereby causing gear segments 217 to feed the cutting tools 216 inwardly and cut off the finished work. As soon as a piece of work is cut off it drops or is drawn by suction down through the tube 222 and is thus disposed of.

The lower end of the shank 212 see Fig. 4, is supported on a cross bar 223 that rests upon, and is urged upwardly by compression springs 224 and is guided on downwardly protruding stud pins 225. Springs 224 are disposed on posts 226.

The cam operated devices for lifting the several tools are mounted on bracket plates 227, Figs. 14, 15, 4 and 5 that are adapted to be inserted through openings in the lower housing 21 and secured to said housing. At station No. X a bracket plate 227' of larger size than the brackets 227 is provided, said bracket plate being similar in purpose and function to the bracket plates 227 except that it affords a support for two cam operating devices instead of one, see Fig. 4.

The bracket plates 227 each have inwardly protruding spaced apart arms 228 at the inner ends of which are provided, a transverse pivot pin or bolt 230, Figs. 14, 15 and 16, upon which two bifurcated bracket members 231 and 232 are mounted. The bifurcated members 231 at each station are connected by blocks 233 with grooved collars or other suitable devices of a form hereinbefore described by which the shafts at the several stations may be raised and lowered. The bifurcated member 231 on each pivot 230 is provided with a lug 234, Fig. 14 that is adapted to engage beneath a shoulder 235 on the adjacent bifurcated member 232. A relatively strong helical torsion spring 236 is wound around the hub of each member 231 and has one end connected with an arm of member 231 and the other end connected with an arm of member 232 in such a manner as to yieldingly urge such members together. The force of a cam in lifting a tool is applied to member 232 and is communicated through spring 236 to member 231, hence, the spring 236 must be strong enough to feed the tool to the work under ordinary circumstances without yielding but must be capable of yielding in case of emergency, or if the tool is blocked, to prevent breakage of parts.

Member 232 has blocks 237 that fit within an annular groove 238 in a tubular shell 240 that is slidably but not rotatably disposed in a sleeve 241 that is journaled in a bearing 242 in bracket plate 227. A thrust bearing 243 is provided between the inner end of sleeve 241 and the end of bearing 242 and a compression spring 244 is provided on the exterior of shell 240 to urge the same inwardly.

245 are cam rods, one or more at each station, having rollers 246 at their inner ends that roll on the respective cams and having squared sections 247 reciprocable in the cam rod supporting drum 27 and preventing the cam rods from turning. The outer ends of the cam rods 245 are cylindrical and fit within the tubular shells 240 and said cam rods are each bored, Fig. 14, to afford a recess 248 for the joint reception of a nut 250 and a differential adjusting screw that is threaded through said nut. The differential adjusting screw is made up of two sections 251 and 252 respectively having threads of different pitch and terminates in a squared head 253.

Cam rods 245 are each notched at the outer end to provide two lugs 254, Fig. 16, that protrude therefrom and are adapted to receive therebetween, suitably shaped segments on the head of the nut 250 whereby said nut is prevented from rotating in cam rod 245. Lugs 254 are also adapted to fit within suitable notches in the end of a length changing screw 255 that is threaded into the outer end of the shell 240 and that is also internally threaded whereby one section 252 of the differential adjusting screw may be screwed thereinto. Lugs 254 on the outer ends of the cam rods thus serve to prevent rotation of both the nut 250, and the length changing screw 255.

A graduated gauge collar 256 is provided on differential adjustment screw 252 and a lock nut 257 is arranged to jam said collar securely against the end of the length changing screw 255.

258 is a crank arm that is secured to sleeve 241 and is provided with a handle 260 by which it may be turned. Handle 260 has a spring pressed detent pin 261 arranged to enter a recess 262 in the bracket plate 227 to hold the crank arm 258 and sleeve 241 in a fixed position.

The differential screw forms means for securing a micrometer adjustment between cam rod 245 and the shell 240 in which it is supported thereby varying the effective length of the cam rod and varying the lift that will be imparted to the tool shaft that is connected therewith. In this way a very fine adjustment in the lift of a tool may be secured.

The length changing screw 255 provides for making standard unit variations in the length of the article that is being made, each rotation of the crank arm 258 making a difference of one unit or a fraction of one unit in the finished article. If parts for standard pin tumbler locks are being made it is desirable to vary the length of said parts to fit locks having a greater or less number of tumbler pin receiving barrels. The length changing screw 255 makes this adjustment convenient by making it possible to vary the length of the work exactly one unit for each complete revolution of the screw 255.

At stations where the lift of the tool is constant regardless of the length of the work that is being made the length changing screw 255 and connected parts are omitted and only the differential adjustment screws are used.

The mechanism for driving the machine embodies a main drive shaft 263 Figs. 1, 5, 17, 18 and 19 that extends inwardly from one side through a gear housing 264 and through the lower machine housing 21 and is provided on its inner end with a bevel gear 265 that meshes with another bevel gear 266 on the vertical stub shaft 191 that has spur gear 188 on its upper end that meshes with and drives main driving gear 177.

Shaft 263 has a worm 269 that meshes with worm wheel 270 on vertical shaft 85. Shaft 85 extends downwardly into base frame 20 and is connected by bevel gears 271 with horizontal shaft 272 which is, in turn, connected by bevel gears 273 with vertical shaft 274 that is provided on its upper end with spur gear 275 that meshes with the gear wheel 44 on the top of the cams 28 to 39 inclusive and drives said cams.

A shaft 276 which drives an oil pump not shown is also connected by bevel gears 278 with vertical shaft 85 just below worm wheel 270.

Shaft 85 extends upwardly to the top of the machine and drives the stock feed and indexing mechanism as hereinbefore explained and said shaft is provided above the worm wheel 270 with a clutch 280 that may be disengaged to permit the upper end of said shaft to be turned relative to the lower end, by handwheel 281 to set the stock tube drum so that it will have the proper sequence of operations.

Shaft 263 may be provided with a belt pulley 277 by which it may be driven and may have a clutch 279 interposed between the belt pulley 277 and the machine. Mounted on the cover plate 24 of the stock tube drum 23 is a stock magazine and feed mechanism in which a supply of bar stock is carried and by which a bar of stock is fed into a stock tube as soon as the bar that is in said tube is substantially used up. This mechanism Figs. 22, 23 and 24, comprises a centrally arranged tube 282 secured at its lower end to bottom disc 283 and at its upper end to hub 284 of top disc 285 and rotatably journaled by means of bearings 286 on vertical shaft 287 that is rigidly secured to the cover plate 24 of shell 23.

Top disc 285 is provided near its periphery with a plurality of perforations 288 through which bars of stock 76 may be inserted. The bars of stock 76 are arranged to rest in peripheral recesses 291 in the bottom disc 283 and are held in the peripheral recesses 291 throughout the greater portion of the distance around the circumference of the disc 283 by an annular guard member 292 that is fixedly supported by a bracket 293. At one point where the bars of stock 76 are fed into the stock tubes 68 the guard member 292 is bent or curved outwardly as at 294 to permit the bars of stock to be moved by a deflector 295 off a ledge 296 on which they ordinarily rest whereby they will drop into a tubular guide member 297 by which they are directed into the stock tubes 68. A trip arm 298 is provided below the guide member 297 for supporting a bar of stock in readiness to drop into a stock tube, said trip arm 298 being secured to a pivot pin 300 that extends upwardly through the stock tube drum cover 24 and the pivot pin 300 having, on its upper end, a lever arm 301 whose outer end projects into a notch 302 in a reciprocably supported horizontal bar 303.

The inner end of bar 303 projects into the tubular end of another bar 304 and is connected therewith by a pin 305 that extends through bar 303 and through slots 306 in tube 304 and that has a collar 307 secured thereto on the exterior of bar 303. A compression spring 308 interposed between collar 307 and a flange 310 on the forward end of bar 304 urges bar 303 inwardly.

Bar 304 is arranged to be reciprocated by a lever arm 311 that is mounted on a fulcrum 312 and has a roller 313 on its upper end arranged to roll in a groove 314 in a cam 315 that is mounted on the cam shaft 81 on the top of the stock tube drum. The cam 315 is arranged to move the bar 304 and either compress the spring 308 inwardly each time the stock tube rack is indexed.

Figure 24:
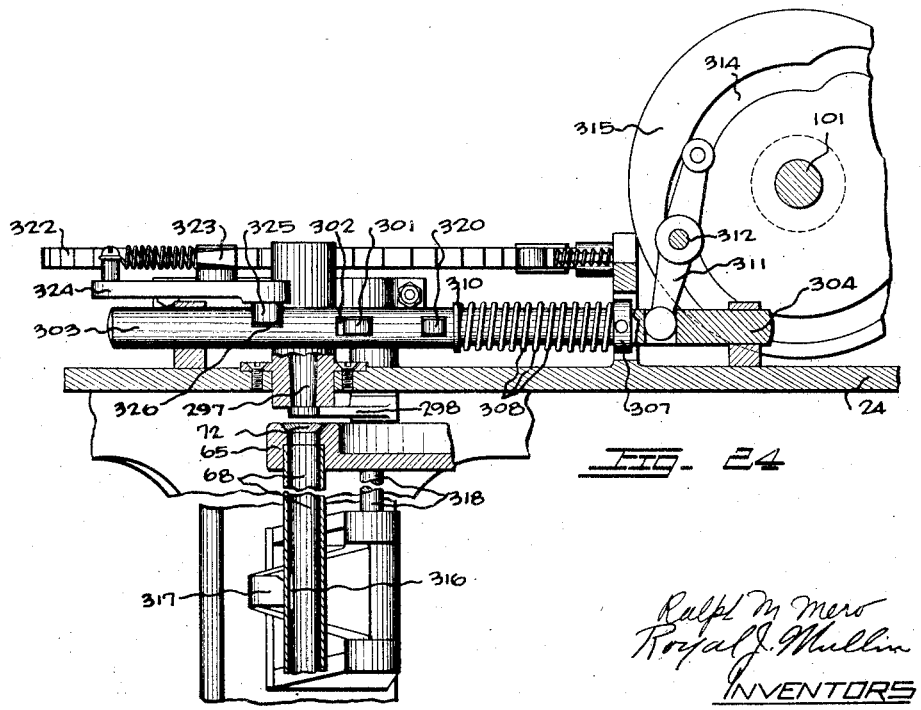
Fig. 24 is a view partly in elevation and partly in section substantially on broken line 24—24 of Fig. 23.

To prevent movement of the bar 303 except when a stock tube 68 is ready for the reception of another bar of stock we provide near the bottom end of each stock tube 68 an opening 316, Fig. 24, through which a testing arm 317 may enter. The testing arm 317 is secured to the lower end of an oscillatory shaft 318 which extends upwardly through cover plate 24 and is provided with a fixedly mounted lever arm 320 whose outer end is disposed within a slot 321 in the bar 303. Each time the stock tube rack is indexed the bar 304 is moved inwardly and an impulse is communicated to bar 303. If the end of testing arm 317 strikes against a bar of stock 76 in a tube 68 the bar 303 will only be moved a short distance and the remainder of the movement of bar 304 will only compress the spring 308. If, however, the top end of the bar of stock in the tube 68 that is being tested has dropped below the level of the end of the testing arm 317 then the testing arm will move freely into the tube 68 and the trip arm 298 will be moved to one side thus releasing a bar 76 of stock and permitting it to drop first onto the end of the testing arm 317 and then onto the top end of the stub of a bar 76 that remains in the tube 68 when the trip arm 298 is withdrawn. Testing arm 317 thus serves to receive the blow due to the dropping of a bar of stock 76 and then release the bar of stock with very little shock to the stub that is held in the collet. The dropping of the new bar is preferably timed so that it occurs while the stub of the old bar rests on the gauge 150 by which the feed of the same is determined.

322 is a ratchet wheel that is secured to the bottom side of bottom magazine plate 283 and is adapted to be engaged by a pawl 323 on a lever arm 324 that has a roller 325 that operates in a notch 326 in the bar 303 so that when the bar 303 moves the maximum distance, permitted only when the end of test arm 317 enters fully into the tube 68 on which the test is being made, pawl 323 will engage with a different tooth on ratchet wheel 322, and, upon the return movement of bar 303 the magazine will be advanced one step thus causing another bar of stock to drop into the guide member 297 in readiness to be fed into the next empty stock tube.

A detent in the nature of a spring pressed roller 327 is arranged to engage the ratchet wheel 322 to prevent the same from being moved in the wrong direction.

In the operation of this machine bars of stock 76 are fed from the stock bar magazine on the top of the machine into the stock tubes 68 of the rotatably mounted stock bar rack. As the stock bar rack is indexed, the collets are stopped at the several successive work stations in alignment with the various tools and work is done thereon. At station I, as soon as the stock bar rack is stopped and locked, the collet at that station is unlocked, the bar of stock therein drops down onto the gauge 150, the yielding pressure tending to turn the gauge to one side is exerted and if only a short stub of a stock bar is left the stub is thrown out and the bar that rests thereon drops down on the gauge. The gauge is then lifted to the proper position to gauge the length of the protruding end of the stock bar and the collet is locked. As the stock tube rack is indexed through the ten succeeding movements the stock bar that is lowered at station I may have various work done thereon at stations II to VIII inclusive and will preferably be tested at station IX and the finished piece of work cut off at station X leaving the bar in condition to again drop down onto the gauge 150 when it completes the cycle and arrives again at station I. In this way a continuous cycle of work is carried on without interruption, the material being fed into the machine in bar form and discharged in the form of finished articles.

The foregoing description and accompanying drawings clearly disclose a preferred embodiment of our invention but it will be understood that this disclosure is merely illustrative and that such changes in the same may be resorted to as are within the scope and spirit of the following claims.

We claim:

1. A multiple spindle automatic machine embodying an upright frame, a cam drum mounted centrally on the base of said frame, a plurality of cams rotatably mounted within said cam drum, means for driving said cams, a plurality of tool shafts arranged around said cam drum in equally spaced relation, tools on the upper ends of said tool shafts, devices operated by said cams and guided by said cam drum for raising said tools, spring means for lowering said tools, means for adjusting said tool raising means, a rack rotatably mounted co-axial with and above said tools said rack having stock bar holding devices arranged in alignment with said tools and means for indexing said rack.

2. An automatic machine of the class described embodying a frame, a plurality of cams rigidly secured together and forming a cam bank mounted in the lower portion of said frame for rotation on a vertical axis, a plurality of tool shafts arranged concentrically around said cam bank in spaced apart relation, tools at the upper ends of said tool shafts, separate means operated by a different cam for moving each of said tools vertically, and means for supporting bar stock on which work is to be done in the path of movement of said tools.

3. An automatic machine of the class described embodying an upright frame, a cam bank rotatably mounted in the lower portion of said frame said cam bank embodying a plurality of cams rigidly secured together, a plurality of tool shafts arranged concentrically around said cam bank in spaced apart relation, tools at the upper ends of said tool shafts, means for driving said tools, means operated by said cams for moving said tools vertically, devices for adjusting said tools elevating means to vary the lift of said tools and means for supporting bars of stock above said tools whereby said tools may be applied to the ends of said bars of stock.

4. In a multiple spindle automatic machine, a base, a lower frame mounted on said base, an upper frame mounted on said lower frame, a stock tube drum mounted on said upper frame, a magazine mounted on said stock tube drum, a stock tube rack mounted for indexing movement within said stock tube drum, said stock tube rack embodying a plurality of tubes arranged around the axis of the machine and adapted for the reception of bars of stock, collets at the lower ends of said tubes for releasably holding bars of stock, a plurality of tools mounted for rotary and longitudinal movement in alignment with said collets, means for driving said tools and means for moving said tools longitudinally.

5. An automatic machine of the class described embodying a plurality of tool shafts, tools at the ends of said tool shafts, means for rotating said tools, automatic means for moving said tools lengthwise of said tool shafts, and manually operated adjusting devices for producing unit variations in the distance of movement of said tools lengthwise of said shafts.

6. An automatic machine of the class described embodying a plurality of tool shafts arranged in circular formation, tools at the ends of said tool shafts, means for rotating said tools, means for moving said tools lengthwise of said tool shafts, differential screw means for adjusting said lengthwise movement of said tools and manually operated adjusting devices for producing unit variations in the distance of movement of said tools lengthwise of said shafts.

7. An automatic machine of the class described embodying a plurality of cams mounted for rotation on a vertical axis, a plurality of vertical tool shafts arranged in a circular path around said cams, tools on the upper ends of said tool shafts, means operated by said cams for raising said tools, differential screw devices for adjusting said cam raising means, and other adjusting devices for producing unit variations in the distance that said tools will be raised by said cams.

8. In an automatic machine of the class described, a plurality of cams rotatably mounted on a vertical axis, a plurality of vertical tool shafts arranged around said cams, tools on the upper ends of said tool shafts, cam followers arranged to engage said cams, means operated by said cam followers for lifting said tools and differential screw means for varying the effective length of said cam followers to thereby vary the lift of said tools.

9. In an automatic machine of the class described, a frame, a cam bank embodying a plurality of relatively fixed cams mounted for rotation on a vertical axis on said frame, a plurality of vertical tool shafts arranged around said cam bank, tools on the upper ends of said tool shafts, cam followers for said cams, means operated by said cam followers for lifting said tools, spring means urging said tools downwardly, differential screw means for varying the effective length of said cam followers to thereby vary the lift of said tools and other devices for producing unit variations in the effective length of said cam followers to effect unit variations in the lift of said tools.

10. In an automatic machine of the class described, a cylindrical frame, a plurality of cams mounted for rotation on the central vertical axis of said frame, a plurality of tool shafts arranged at intervals around said cams, vertically movable tools on said tool shafts, means for supporting work above said tools and removable tool elevating cam follower units arranged to be inserted from the exterior of said frame and forming operative connections between said cams and said tools for elevating said tools.

11. In a multiple spindle automatic machine, a housing, an upright tubular column arranged axially of said housing, bar stock holding devices rotatable on said tubular column, means for indexing said bar stock holding devices, a lock for said bar stock holding devices, means disposed within said tubular column for operating said locking device and tools arranged below said bar stock holding devices for application to bar stock held therein.

12. In an automatic machine of the class described, a housing, a vertical tubular column arranged axially of said housing, bar stock holding devices rotatable on said tubular column, a cam on the top of said frame for indexing said bar stock holding devices, a lock at the lower end of said bar stock holding devices for locking the same in fixed position between indexing movements, means operated from the top of said frame and including a bar extending downwardly through said column for operating said lock and tools below said bar stock holding devices for operating on bars of stock held therein.

13. In an automatic machine of the class described, a frame, a stock tube rack mounted for rotation on a vertical axis in said frame and embodying a plurality of spaced apart collets arranged in a circular path and each connected with vertical stock bar guides, devices for indexing said stock tube rack to move said collets to successive work stations, tools operatively disposed below said collets at said work stations, locking devices projecting outward radially from said collets and a vertically movable bar at one of said work stations outside of the path of movement of said collets and arranged to engage with and operate the collet locking device of the collet at that station between successive indexing movements.

14. An automatic machine of the class described embodying a base, a lower frame on said base, an upper frame on said lower frame, a stock tube drum on said upper frame, a tubular column arranged axially of said frame parts, a concentrically arranged cam drum secured to said base, a plurality of cams rotatably disposed in said cam drum, a plurality of tool supports arranged in spaced apart relation in a circular path around said cam drum, tools mounted for rotary and longitudinal movement on the upper ends of said tool supports, cam followers guided in said drum and operated by said cams for raising said tools, a stock bar rack rotatably mounted in said stock tube drum for holding bars of stock, and means for indexing said stock bar rack to move bars of stock carried thereby into operative relation with respect to successive tools.

15. In an automatic machine of the class described, a stock bar rack rotatably mounted on a vertical axis and embodying a plurality of spaced apart stock bar holding devices arranged in a circular path, tools rotatably mounted below said stock bar holding devices, means for indexing said stock bar rack and a rotatably mounted stock bar magazine disposed above said stock bar rack and arranged to automatically deliver bars of stock into said stock bar holding devices.

16. In an automatic machine of the class described, a stock bar rack rotatably mounted on a vertical axis and embodying a plurality of spaced apart stock bar holding devices arranged in a circular path, means for indexing said stock bar rack to move said stock bar holding devices to successive work stations, tools at said work stations operable on stock bars in said stock bar holding devices, a stock bar magazine disposed above said stock bar rack and automatic means for delivering bars of stock from said magazine into said stock bar holding devices when the bars in said stock bar holding devices drop below a predetermined elevation therein.

17. In an automatic machine of the class described, a stock bar rack rotatably mounted on a vertical axis and embodying a plurality of spaced apart stock tubes arranged in a circular path, a collet at the bottom end of each of said tubes, means for indexing said stock bar rack, means for opening and closing said collets to permit stock bars therein to drop downwardly, means for gauging the downward movement of said stock bars, a stock bar magazine above said stock bar rack, and trip means for permitting bars of stock to drop by gravity into said stock tubes when the bars already in said tubes have been lowered beyond a predetermined point.

18. In a multiple spindle automatic machine stock bar holding devices, a gauge against which the end of a bar of stock may abut for gauging the distance that a bar of stock may protrude from said stock bar holding devices and devices for tilting said gauge for discharging a stub of a bar of stock that is less than a predetermined length from said stock bar holding devices.

19. In a multiple spindle automatic machine, stock bar holding devices arranged to be indexed in a continuous cycle around a plurality of stations, means at one of said stations for permitting stock bars in one of said stock bar holding devices to feed downwardly, and means at said station for discharging a stub of a bar of stock that is less than a predetermined length.

20. In a multiple spindle automatic machine, stock bar holding devices, arranged to be indexed in a continuous cycle around a plurality of stations, tools at each of said stations operable on the ends of said stock bars, gauge means at one of said stations, means for releasing said stock bars at said gauging station to permit the same to drop down, and means at said gauging station for knocking out stubs of bars that are less than a predetermined length.

21. In a multiple spindle automatic machine, vertically arranged releasable stock bar holding devices, a gauge member below said stock bar holding devices whereon a bar of stock may drop when it is released by said stock bar holding devices and yielding means tending to turn said gauge member to one side while said holding means is in released position to thereby discharge a short stub of a stock bar.

22. In a multiple spindle automatic machine, vertically arranged stock bar holding devices, collets at the lower ends of said stock bar holding devices, a gauge member below said collets, means for releasing said collets when the same are above said gauge member to permit bars of stock to drop onto said gauge member, a shoulder on said gauge member at the side of the surface on which bars of stock rest, yielding means tending to turn said gauge member sidewise while a bar of stock rests thereon, and means for raising said gauge member to a gauging position after said turning impulse has been exerted.

23. In a multiple spindle automatic machine, stock bar holding devices arranged in a circular path in spaced apart relation and adapted to be indexed in a continuous cycle around a plurality of stations, tools at said stations operable on the ends of bars of stock in said stock bar holding devices, a gauge member at one of said stations, means at said gauging station for releasing the bars of stock to permit the same to drop down onto said gauge member, and yielding means tending to turn said gauge member sidewise while a bar of stock rests thereon to thereby discharge a stub of a stock bar that is less than a predetermined length.

RALPH M. MERO.
ROYAL J. MULLIN.